(12) United States Patent
MacTiernan et al.

(10) Patent No.: US 12,417,470 B1
(45) Date of Patent: Sep. 16, 2025

(54) MACHINE LEARNING SYSTEMS FOR OPTIMIZING AUDIO ADVERTISEMENTS

(71) Applicant: Amazon Technologies, Inc., Seattle, WA (US)

(72) Inventors: Daniel Neil MacTiernan, Ocean City, NJ (US); Rohit Bhatia, San Carlos, CA (US); Laurence Benjamin Linietsky, Montclair, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 18/064,197

(22) Filed: Dec. 9, 2022

(51) Int. Cl.
*G06Q 30/0241* (2023.01)
*G06Q 30/0251* (2023.01)
*H04N 21/233* (2011.01)
*H04N 21/439* (2011.01)

(52) U.S. Cl.
CPC ....... *G06Q 30/0251* (2013.01); *H04N 21/233* (2013.01); *H04N 21/4394* (2013.01)

(58) Field of Classification Search
CPC .......................... H04N 21/233; H04N 21/4394
See application file for complete search history.

(56) References Cited

U.S. PATENT DOCUMENTS

| | | | |
|---|---|---|---|
| 8,090,613 B2 | 1/2012 | Kalb et al. | |
| 9,159,073 B2 | 10/2015 | Collins et al. | |
| 9,208,507 B2 | 12/2015 | Mattern et al. | |
| 10,007,933 B2 | 6/2018 | Simeonov et al. | |
| 11,062,360 B1* | 7/2021 | Donamukkala | G06N 20/00 |
| 2006/0247973 A1* | 11/2006 | Mueller | G06Q 20/20 |
| | | | 705/26.1 |
| 2008/0177819 A1* | 7/2008 | Reshef | G06Q 30/02 |
| | | | 709/201 |
| 2015/0073921 A1* | 3/2015 | Vasudevan | H04H 60/56 |
| | | | 705/14.72 |
| 2016/0007065 A1* | 1/2016 | Peles | H04N 21/23439 |
| | | | 725/34 |
| 2017/0104875 A1* | 4/2017 | Im | H04M 3/42221 |
| 2018/0343501 A1* | 11/2018 | Yu | H04N 21/43615 |

(Continued)

FOREIGN PATENT DOCUMENTS

WO   WO-2021167998 A1 *  8/2021   .......... G06F 18/2113

*Primary Examiner* — Vincent M Cao
(74) *Attorney, Agent, or Firm* — Robert C. Kowert; Kowert, Hood, Munyon, Rankin & Goetzel, P.C.

(57) ABSTRACT

Embodiments of an audio advertising optimization system are disclosed to enable optimization of audio ad play selection and audio ad content creation using machine learning techniques. In embodiments, the system uses audio processing model(s) to extract metadata about audio ads that it receives from advertisers, such as speaker voice characteristics, music characteristics, and types of call-to-action (CTA) used. As the ads are played to users by ad servers, conversion results associated with the ad plays are recorded. Machine learning model(s) are built based on the ad metadata, user metadata, listening context data, and the user conversion results to learn conversion patterns of the ads. The conversion patterns may be used to optimize the play selection of ad servers to improve conversion rates. In embodiments, the conversion patterns may be made available to ad production systems, which may use the data to optimize audio ad content.

20 Claims, 9 Drawing Sheets

(56) References Cited

U.S. PATENT DOCUMENTS

| | | |
|---|---|---|
| 2018/0376186 A1 | 12/2018 | Kitts et al. |
| 2019/0034976 A1* | 1/2019 | Hamedi ............. G06Q 30/0243 |
| 2019/0287138 A1* | 9/2019 | Buchalter .......... G06Q 30/0275 |
| 2019/0392487 A1* | 12/2019 | Duke ................... G06V 30/413 |
| 2020/0021873 A1* | 1/2020 | Swaminathan ...... H04N 21/466 |
| 2020/0090212 A1* | 3/2020 | Marchenko ........ G06Q 30/0246 |
| 2020/0336450 A1* | 10/2020 | Gao .................. G06Q 30/0246 |

* cited by examiner

Audio Ad Campaign Report 510

Campaign Name: Allergy Medication XYZ
Campaign Start Date: October 1, 2022
Campaign End Date: January 31, 2023

Total Impressions: 10,444
Overall Conversion Rate: 30%

Ads in Play Rotation: 520

| Ad Version 522 | Ad Features 524 | Top Conversion Patterns 526 | Conversion Rate 526 |
|---|---|---|---|
| Male_Voice-Rock_Music-CTA1 | View | gender=male; pub content=rock music | 30 |
| Female_Voice-Country_Music-CTA1 | View | gender=female; ad time=evening | 30 |
| Male_Voice-Country_Music-CTA2 | View | engage sys=smart phone app A | 20 |

Top Patterns for Allergy Medication: 530

| Conversion Pattern Attributes 534 | Conversion Result 532 | Strength 536 |
|---|---|---|
| gender=male; ad music=rock; ad time=evening | CTA=answer questions; time=evening | 90 |
| gender=female; ad time=morning | CTA=order with code; time=morning | 70 |
| age=under 15 | No Conversion | 70 |

[View Details] [Download Patterns] [Config Model] [Modify Ads]

*FIG. 5*

New Audio Ad Upload 610

| | |
|---|---|
| Ad Name: | Female_Voice-Classical_Music-CTA2 |
| Ad Length: | 15 seconds |
| Ad Product: | Allergy Medication XYZ |
| Voice Type: | Female, Slow |
| Music Type: | Classical, Slow |
| CTA Type: | Visit product website |

[Add to Campaign]  [Correct Ad Metadata]

Relevant Conversion Patterns for Allergy Medication: 620

| Conversion Pattern Attributes | Conversion Result | Strength |
|---|---|---|
| gender=female; pub content=classical music | CTA=visit website; time=evening | 90 |
| gender=female; age=45 to 55 | CTA=visit website | 80 |
| gender=female; pub content=health podcast | Conversion | 70 |
| gender=female; age=under 15 | No Conversion | 70 |

[Filter Patterns]  [Search for Patterns]  [Recommend Publisher Media]

*FIG. 6*

MACHINE LEARNING SYSTEMS FOR OPTIMIZING AUDIO ADVERTISEMENTS

BACKGROUND

Digital advertising has been established for many decades with the advent of the Internet. The most prevalent and well-established type of digital advertising media are display ads (e.g. banner ads). As digital advertising technology has grown over recent years, creative optimization techniques have become increasingly common. For example, ad servers in modern ad delivery platforms are able to use results of previous ad impressions to adjust or tailor the display ad (e.g. the imagery, text, or discount offer presented within the ad) to target end-users. These optimizations can substantially improve the user conversions generated by the display ad.

Audio advertising is a less mature form of digital advertising. Digital audio ads may be inserted within audio content such as song playlists, podcasts, or live streaming content. Current audio ad delivery platforms do not generally provide creative optimization for audio ads. Typically, an advertiser provides several versions of an audio ad for an ad campaign, and the ad delivery platform will play the versions in an even rotation. This approach does not allow the creative content or the play selection of the audio ads to be optimized. Another distinction between audio ads and display ads is that while display ads typically use only a single type of call-to-action (CTA) to generate user conversions (a click or tap), audio ads can have many different types of CTA. For example, an audio ad may direct the user to remember a phone number, take the user directly to a product website, or add a product to a shopping cart. Current advertisers must make a guess as to the best type of CTA to engage end-user listeners, and have no easy way of changing the CTA based on conversion results.

BRIEF DESCRIPTION OF THE DRAWINGS

FIG. 5 illustrates an example user interface that outputs conversion patterns for a group of audio ads detected by the AAOS, according to some embodiments.

FIG. 6 illustrates an example user interface that outputs conversion patterns relevant to a new audio ad uploaded to the AAOS, according to some embodiments.

Figure 1:
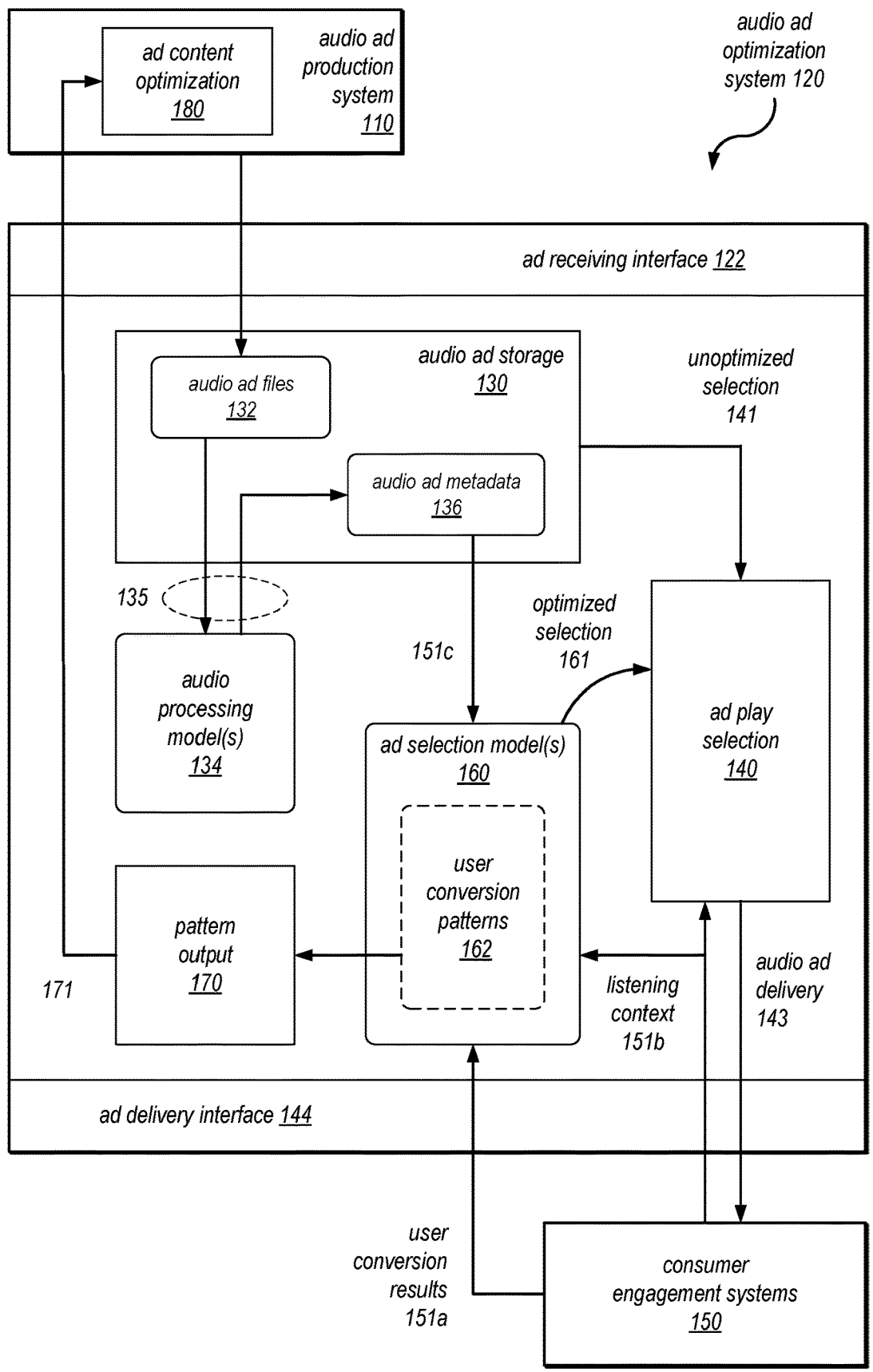
FIG. 1 is illustrating an embodiment of an audio ad optimization system (AAOS) that enables play selection and creative content optimization of audio ads, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Digital audio ads are ads played to users aurally, typically during other types of audio content such as song playlists, podcasts, or live streaming content. Current audio ad delivery platforms do not generally provide creative optimization for audio ads. Typically, an audio ad delivery platform may play audio ads from advertisers in an even rotation (e.g. randomly) or according to a set of static play selection rules. However, the platform will not optimize the play selection of the audio ads over time or provide detailed feedback to advertisers to allow the advertisers to optimize the creative content of their ads.

One aspect of audio ads that would benefit from optimization is the call-to-action (CTA) used in audio ads to generate user conversions. Consumers have preferences in the types of CTAs that they interact with, for example, visiting a product website, registering for a mailing list, etc. New types of CTAs are emerging with voice assistants, where the voice assistant is able to provide additional information about the product to the consumer, answer user questions or pose questions to the user about the product through conversation, or order the product directly from the vendor. The proliferation of new types of CTAs makes it difficult for advertisers to select a single type of CTA for an audio ad. As a result, some advertisers will create multiple versions of an audio ad with different types of CTAs, such as:

To learn more, go to product website
To learn more, ask voice assistant to send more info about product
To learn more, ask voice assistant to tell me about product
To purchase, search e-commerce website for product
To purchase, ask voice assistant to add product to wish list
To purchase, ask voice assistant to add product to shopping cart
To purchase, ask voice assistant to order product However, a large number of variations of an audio ad can frustrate consumers who will not engage with the ad if their preferred CTA is not provided in the audio ad, thereby lowering the overall conversion rate of the ad campaign. For example, some consumers may hear the CTA "ask voice assistant" but prefer to visit the product website, or other consumers may be prompted to "order" the product but are more comfortable adding the product to a wish list before ordering, etc.

To solve these and other problems related to audio ad delivery systems in the state of the art, this disclosure describes embodiments of an audio ad optimization system (AAOS) that programmatically optimizes the play selection and creative content of audio ads using machine learning techniques. In some embodiments, the AAOS uses audio processing model(s) to extract metadata about audio ads that it receives from advertisers. The audio processing models may include machine learned models such as speech recognition models and natural language processing models to extract a rich set of features from the audio ad, such as speaker voice characteristics, speech content, music characteristics, the type(s) of CTA used in the audio ad, and so on.

In some embodiments, when the audio ads are played to users by ad servers of the ad delivery platform, conversion results associated with individual ad impressions are recorded. The conversion results are saved with other data (e.g. the extracted ad features, user metadata about the listener, the listening context associated with the ad impression) to create input or training datasets for machine learning model(s). The machine learning model(s) consume the input or training data to detect conversion patterns of the audio ads. For example, a conversion pattern may indicate that for a particular product, audio ads featuring a female voice played to a female listener with a particular type of CTA is likely to yield a type of conversion. The detected conversion patterns may be reduced to a set of structured records and used by the ad servers to optimize play selection of the audio ads to improve conversion rates of the ads. For example, the ad servers may use the conversion patterns to select a version of an audio ad with the best CTA type for a given user and/or listening context.

In some embodiments, the ad delivery platform may initially play a group of audio ads in an even rotation or randomly for an observation period without optimization (e.g. without use of any machine learned conversion patterns). During the observation period, machine learning models are built, trained, or seeded based on observation data collected during the period to learn conversion patterns. After the observation period, the ad servers will switch to an optimized play selection using conversion patterns learned by the machine learning models. In some embodiments, the system may implement a continuous feedback loop, where the machine learning model(s) or conversion patterns are repeatedly updated based on new observation data to progressively improve or maintain ad conversion performance.

In embodiments, the conversion patterns may be made available to ad production systems, which may be operated by either third party advertisers or as part of the ad delivery platform itself. The conversion patterns may be used by the ad production systems to programmatically create or modify audio ads. For example, the ad production system may determine from the patterns that a type of CTA yielded particularly good conversion results for a specific type of listener, and programmatically modify an audio ad to use the CTA type to better target that type of listener. In some embodiments, the ad production system may employ a text-to-speech technology to modify or generate ad content. For example, the ad production system may automatically convert an ad from an "add to cart" CTA to an "add to shopping list" CTA, based on one or more observed conversion patterns, by generating a new script for the CTA in a text format and then producing an audio version of the CTA from the script (e.g. generating the appropriate speech and accompanying music). In some embodiments, the updating of audio ads may be performed as an automatic feedback loop to continuously improve the content of audio ads.

Depending on the embodiment, the machine learning model(s) and/or conversion patterns may be generated based on different optimization scopes. For example, the system may maintain model(s) and/or generate conversion patterns based on the observation data for just a particular advertiser. As another example, the system may maintain model(s) and/or generate conversion patterns based on data of all audio ads promoting a particular type of product. In some embodiments, the optimization scope of the model(s) and/or conversion patterns may be configurable via a configuration interface of the system.

In some embodiments, the conversion patterns detected by the system may be presented to users (e.g. third party advertisers) via a graphical user interface (GUI). The supplying of these insights can be important for marketers and business owners, who may want to review the insights that the system learns (e.g. the conversion patterns) and utilize this information to make future advertising or marketing decisions, including decisions regarding external systems. An individual conversion pattern may indicate a particular type of conversion result, a combination of attributes (e.g. ad features, listener features, and listener context attributes) that is correlated with the conversion result, and a pattern metric. The pattern metric may be a conversion metric or a strength score that indicates the correlation strength, likelihood, or confidence of the pattern. In some embodiments, the system may provide a search or querying capability via the GUI to allow users or client software to search for or filter conversion patterns learned by the system.

As may be understood by those skilled in the art, the AAOS described herein is a specialized computer system that improves the functioning of existing computer systems that deliver digital audio ads to user engagement systems such as smartphones and voice assistant devices. The disclosed system implements a practical application to, among other things, programmatically improve play selection of audio ads and generate machine learned conversion patterns to optimize audio ad play selection and audio ad content. The disclosed features are designed to solve technical problems rooted in the computer field, and are not intended to capture any human mental and pen-and-paper processes, basic methods of organizing human activity, pure mathematical processes and formulas, and/or conventional business practices. These features and advantages of the AAOS system are described in further detail below, in connection with the figures.

FIG. 1 is illustrating an embodiment of an audio ad optimization system (AAOS) that enables play selection and creative content optimization of audio ads, according to some embodiments.

As shown, the figure depicts an audio ad optimization system 120. AAOS 120 provides an ad receiving interface 122 to receive audio ad files 132 from an audio ad production system 110. The audio ad production system 110 is a system that produces and uploads audio ads to an audio ad delivery system that implements the AAOS 120. Depending on the embodiment, the audio ad production system 110 may be a system operated by a third party (e.g. an advertiser or a client of the ad delivery system), or a subsystem of the audio ad delivery system itself. The ad receiving interface 122 may be a programmatic interface such as an API, or an interactive interface such as a GUI.

As shown, the audio ads are uploaded to the AAOS as audio ad files 132 (e.g. MP3 files). The audio ad files 132 are stored in an audio ad storage 130, which may be a file system, a database that indexes the audio ad files 132 for fast access, or some other type of storage system. In some embodiments, the audio ads are read from the audio ad storage 130 by the ad play selection component 140 of the AAOS and played to consumer engagement systems.

As shown, when the audio ad files 132 are received, the AAOS uses one or more audio processing models 134 to process 135 the files and extract audio ad metadata 136 for individual audio ads. In some embodiments, the audio processing model(s) 134 are machine learning (ML) models. The model(s) 134 may include speech recognition models that detects speech or voice characteristics of speakers in the audio ads, and/or natural language processing (NLP) models that recognizes the words and/or semantic content of the spoken script in the audio ads.

The audio ad metadata may include a variety of classification features of the audio ad. Examples of extracted voice characteristics may include things such as speaker gender, speaker age, speaker accent, number of distinct speakers, speaker pace, speaker volume, voice inflection, speaker language, etc. In some embodiments, the ML model(s) 134 may identify specific content in the speech such as the use of specific words, the type of product being promoted, the type and informational content of the CTA, etc. In some embodiments, the model(s) 134 may extract additional metadata about the CTA such as the number of times a CTA is repeated in the ad, where in the ad a CTA appears (e.g. beginning, middle, or end), voice of melodic characteristics of the CTA, etc. The audio processing model(s) 134 may also extract characteristics about any background music played in the ad, including the type of music (e.g. country, rock, classical), the auditory qualities of the music (e.g. soft or loud, fast or slow, somber or upbeat, lyrical or instrumental). Additionally, the ad metadata 136 may include metadata that are not extracted using audio processing. Examples of such metadata may include the audio file name, the length or size of the audio file, the promoted product or service, the identity of the advertiser, or one or more specific artists whose content is used in the ad, etc. In some embodiments, the ad metadata 136 is encoded into a concise feature vector, which can be readily consumed by downstream machine learning models (e.g. ad selection model(s) 160).

As shown, after the audio ads are stored in the audio ad storage 130, an ad play selection component 140 will begin selecting individual audio ads to deliver 143 to consumer engagement system 150 to create ad impressions. In some embodiments, the ad play selection component 140 is implemented by individual ad servers in a fleet of ad servers of the ad delivery system. The audio ads may be delivered via an ad delivery interface 144, which may be a programmatic interface such as an API or service interface. The ad delivery interface 144 may receive listener context information 151b for ad impression slots from consumer engagement systems 150 and serve up individual audio ads for the slots based on the listener context information. The audio ads may be delivered and played by consumer engagement systems during the middle of publisher content such as song lists, podcasts, live broadcasts, etc.

The consumer engagement systems 150 includes a variety of computer devices that form the ad distribution network of the ad delivery system. Examples of consumer engagement systems 150 may include music play devices, smartphones (including particular apps on smartphones), user wearable devices, personal computers, vehicles, web portals, and the like. One example of a consumer engagement system 150 is an e-commerce website that lists items for sale to users and/or plays audio ads to promote certain items. Such a website may maintain user data about individual users such as demographic information about a user, promotional preferences of the user, the purchase history of the user, etc. Another type of consumer engagement device is the voice assistant device, which is capable of interacting with the user through conversation. This conversation capability allows the voice assistant to implement different types of CTAs, for example, to answer user questions about an item or service, pose questions to the user about an item or service (e.g. asking for user opinions about a product or a related topic), manage a shopping cart of the user, or order items on behalf of the user. User responses to these CTAs may be captured by the voice assistant as conversion result data. A voice assistant device may comprise a smartphone with an installed voice assistant app. In some embodiments, the voice assistant may be integrated with or adapted to work with one or more smart speakers located in various locations near a consumer.

As shown, as the delivered audio ads are played by the consumer engagement systems 150, the consumer engagement systems may return user conversion results 151a to the AAOS. In some embodiments, the user conversion results 151a may be returned via the ad delivery interface 144 of the AAOS. A user conversion result 151a may indicate a user action taken in response to a particular ad impression. Examples of user conversions may include the user actually ordering the promoted product or service, the user adding the product/service to shopping cart or a wish list, the user downloading information about the product/service, the user asking a voice assistant about the product/service, the user requesting a free trial of the product/service, the user subscribing to a user group or mailing list related to the product/service, the user commenting or sharing information about the product/service on social media, among other types of actions. In some embodiments, the conversion result 151a may indicate a negative result, such as a failure to convert after the ad impression, or an explicit indication that the user is not interested in the promoted product or service. In some embodiments, the conversion result 151a may indicate that the user conversion occurred after the passage of a period of time (e.g. a few hours) from the ad impression. In some embodiments, the conversion result 151a may indicate that the conversion occurred on a consumer engagement system other than the consumer engagement system that delivered the ad impression (e.g. the audio ad played on a smartphone app but actual conversion occurred via a web portal).

As shown, once an ad impression occurs, various observation data about the impression, including user conversion results 151a, listener context information 151b, and the ad metadata about the audio ad 151c are gathered by the AAOS. In some embodiments, the gathered information 151a-c are used to create observation datasets for discovering user conversion patterns 162 about the audio ads. User conversion patterns 162 may be discovered using machine learning techniques.

In some embodiments, one or more ad selection models 160 may be built by using the observed data 151 as training data. The ad selection model(s) 160 may be trained using the training data to predict one or more aspects of user conversion results based on an input feature vector of different attributes in the observation data 151. The ad selection model 160 may be built as one or more neural networks, decision trees, support vector machines, regression functions, or some other type of ML model. Once the ad selection model is sufficiently trained to learn user conversion patterns 162 about a group of audio ads, its prediction output can be used by the ad play selector 140 to make optimized ad selections decisions 161. The optimized ad selections will be able to better target different types of users and listening contexts with different audio ads, so as to improve overall user conversion rates.

In some embodiments, the ad selection model 160 may be generated using a statistical modeling technique over the gathered observation data 151. For example, in some embodiments, a principal component analysis (PCA) technique may be used to identify the most predictive feature combinations in the observed data (the principal components) that are correlated with certain types of conversion results. With this type of modeling, a set of the strongest observation data attributes are identified and used to generate the user conversion patterns 162. The optimized play selection 161 may be controlled by the user conversion patterns 162, which may be reduced to a set of structured records (e.g. JSON records) that can be programmatically understood by the ad play selection component 140.

In some embodiments where user conversion patterns 162 learned by the ad selection model 160 are not directly output by the models, a pattern output component 170 may be implemented to extract the user conversion patterns 162. Depending on the type of model, a variety of ML model interpretation techniques may be used to extract the user conversion patterns. For example, if the ML model is a linear model, the coefficients in the learned linear function may be analyzed to determine which feature combinations are the most impactful for certain types of conversion outcomes (e.g. the strongest conversion patterns). For more sophisticated ML models, "black-box" model interpretation techniques such as individual condition expectation (ICE), permutated feature importance, and local interpretable model-agnostic explanation (LIME) may be used to probe the model with synthetic data to determine the conversion patterns. In some embodiments, the user conversion patterns may be generated based on actual ad selection output produced by the model in response to real input data.

As shown, in some embodiments, the ad play selection component 140 may be configured to initially select audio ads to play based on an unoptimized selection method 141. This unoptimized selection may be a purely random selection regardless of the selection input data, or an even rotation that aims to provide equal playing time to each audio ad in a group (e.g. a group of ad variations that promote the same product/service). However, as the ad selection model 160 and/or user conversion patterns 162 mature over time (e.g. after a sufficient amount of training), the ad play selection component 140 will switch to the optimized play selection 161 based on the detected conversion patterns. In some embodiments, the ad play selection component 140 may implement a continuous feedback loop to continuously tune the play selection of the ad play selector 140 based on new observation data 151. For example, the ad play selector 140 may occasionally operate in an experiment mode without selection optimization 161, to look for any new conversion patterns. In some embodiments, the ad play selector 140 may monitor the performance of its ad play selections, and trigger a model or conversion pattern update if the performance drops below a specific level. The performance may be measured using conversion metrics, which may be based on the conversion rate, or a combination of other attributes in the user conversion results 151*a*.

As shown, in some embodiments, the user conversion patterns 162 output by the pattern output component 170 may be provided 171 to the audio ad production system 110, in a second feedback loop. In the second feedback loop, the audio ad production system 110 implements an ad content optimization model 180 that consumes the user conversion patterns 162 and programmatically updates the creative content of the audio ads to achieve better conversion results. Ad content optimizations may include switching to a different type of CTA in the audio ad, changing the speaker voice or background music of the audio ad, changing the spoken script of the ad to include or exclude certain phrases, etc. As with ad play selection optimization, the ad content optimization feedback loop may occur repeatedly to tune the content of the audio ads based on observation data 151 about the ad impressions.

Figure 2:
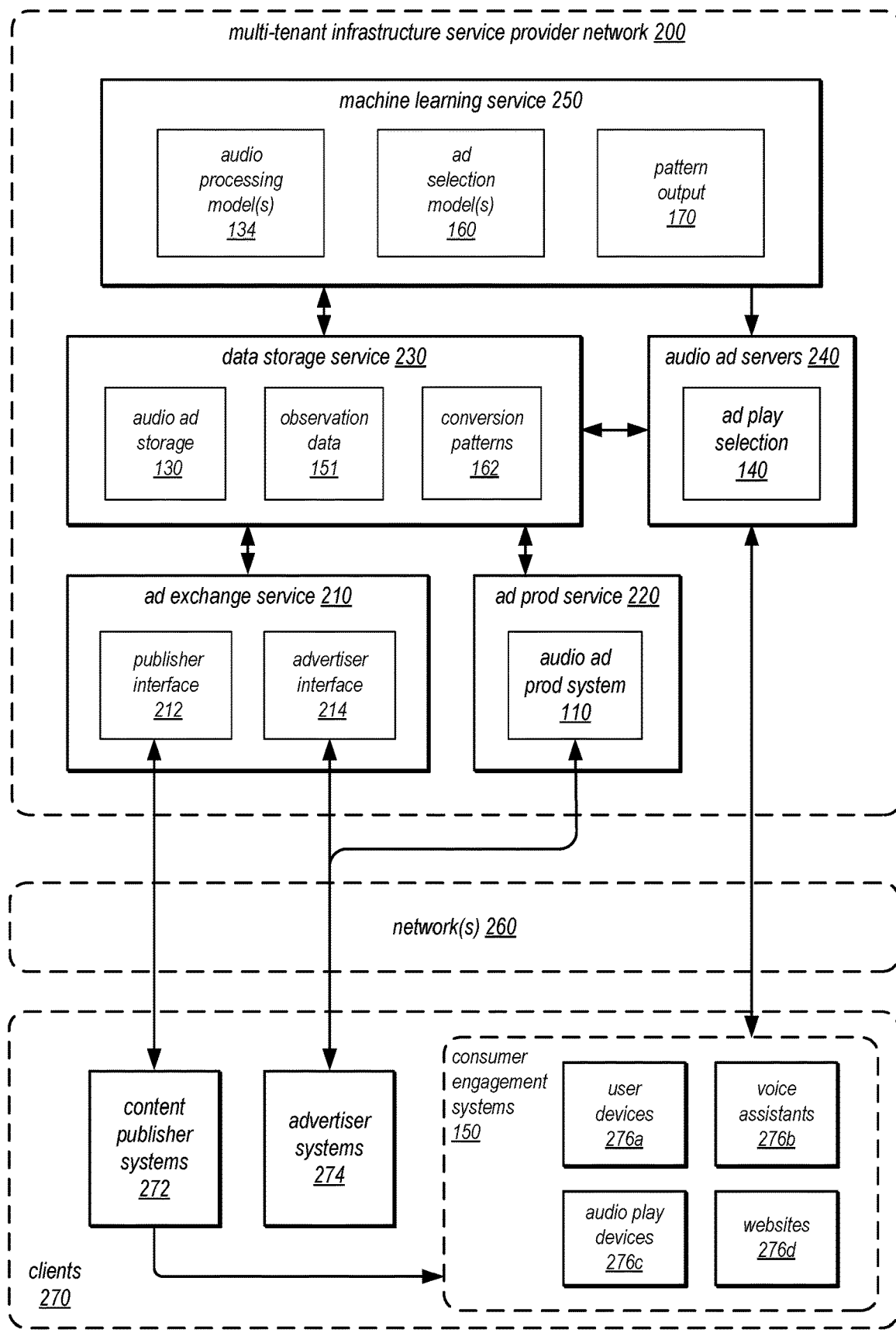
FIG. 2 illustrates an embodiment of the AAOS that is implemented in a multi-tenant infrastructure service provider network, according to some embodiments.

FIG. 2 illustrates an embodiment of the AAOS that is implemented in a multi-tenant infrastructure service provider network, according to some embodiments.

Multi-tenant infrastructure service provider network 200 may be a private or closed system or may be set up by an entity such as a company or a public sector organization to provide one or more computing infrastructure services (such as various types of cloud-based storage) accessible via the Internet and/or other networks to clients 270 in client premises networks, in some embodiments. Service provider network 200 may be implemented in a single location or may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may implement various computing systems, resources, or services, such as a virtual private cloud (VPC) service, one or more compute service(s), data storage service(s) 230, machine learning service 250, as well as other types of services 250. As shown in this example, the services of the provider network are used to implement components of an audio ad delivery system that delivers audio ads provided by advertiser system 274 to consumer engagement systems 150, for example, during audio content provided by content publisher systems 272. The components of the ad delivery system include an ad exchange service 210, audio servers 240, and an ad production service 220.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

The compute service(s) implemented by service provider network 200 offer instances, containers, and/or functions according to various configurations for client operations. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operating system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions of service provider network 200 in different embodiments, including general purpose or special purpose computer servers, storage devices, network devices and the like.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client applications, without for example requiring the client(s) 270 to access an instance. Applications (or other software operated/implemented by a compute instance and may be specified by client(s), such as custom and/or off-the-shelf software.

In some embodiments, compute instances, containers, and/or functions have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30% to 35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic location, etc. and (in the case of reserved compute instances, containers, and/or functions) reservation term length. In this example, compute instances used by the ad exchange service 210, audio ad servers 240, and ad production service 220 may be provided and managed by the compute service(s) of the service provider network 200.

To implement the VPC service, the service provider network 200 provides a physical or substrate network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be logically isolated from the rest of the service provider network, for example it may not be possible to route from a substrate network address to an address in a production network that runs services of the service provider, or to a customer network that hosts customer resources.

The VPC service may implement one or more client networks as overlay networks of virtualized computing resources (e.g., compute instances provided by the compute service(s), block store volumes, data objects such as snapshots and machine images, file storage, databases provided by the database or data storage service(s) 230) that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along the substrate network according to constructs in the overlay network (e.g., VPCs, security groups). A mapping service can coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the service provider network for routing packets between endpoints.

In some embodiments, at least a subset of virtualization management tasks may be performed at one or more offload cards coupled to a host so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like. The offload card can function as a network interface card (NIC) of a host in some implementations, and can implement encapsulation protocols to route packets. In this example, the compute instances used by the ad exchange service 210, audio ad servers 240, and ad production service 220 may be connected as virtual networks provided and managed by the VPC service.

As shown, the ad exchange service 210 provides a publisher interface 212 for publisher systems 272 and an advertiser interface 214 for advertiser systems 274. These interfaces 212 and 214 may be programmatic interfaces such as API or user interfaces such as GUIs. In some embodiments, the publisher interface 212 is implemented as part of a supply side platform (SSP) that allows content publishers to register and sell content or media as inventories of advertising "space" on which audio ads can be played. In some embodiments, the advertiser interface 214 may be part of a demand side system (DSP) that allows advertisers to upload audio ads and purchase advertising space provided by the content publishers to play their audio ads. The advertiser interface 214 may implement the ad receiving interface 122 of FIG. 1. In some embodiments, the buying and selling of the advertising space may be conducted as auctions, where individual publishers ask for a certain price for a number of ad impressions and individual advertisers bid a certain price for ad impressions on certain publisher content.

The data storage service 230 may be various types of data storage and processing services that perform general or specialized data storage and processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, the data storage service 230 may implement various types of databases (e.g., relational, NoSQL, document, or graph databases) for storing, querying, and updating data. Such services may be enterprise-class database systems that are scalable and extensible. Queries may be directed to a database in data store service 230 that is distributed across multiple physical resources, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via APIs. In other embodiments, external applications and programs may submit queries using Open Database Connectivity (ODBC) and/or Java Database Connectivity (JDBC) driver interfaces to the database system. As shown, in this example, the data storage service 230 is used to implement the audio ad storage 130, and also store the observation data 151 collected from ad impressions and the conversion patterns 162 generated from the observation data.

The machine learning service 250 may be used to perform a variety of machine learning tasks, such as preparing ML data, configuring, building, and hosting various types of ML models, performing ongoing model management such as periodic evaluation and retraining. The machine learning service 250 may offer a variety of tools for developing and monitoring ML models, such as tools to monitor the performance of a ML model and/or interpretation and explanatory tools to explain why a ML model made certain decisions. As discussed previously, interpretation and explanatory tools may be used to infer user conversion patterns 162 from black-box models that are not designed to directly output the patterns.

As shown in this example, the service provider network 200 may implement ad production service 220 that allow advertisers to produce audio ads within the service provider network. The ad production service 220 may provide user interfaces that allow users to change the creative content of audio ads, for example, the script, music, CTA, and other creative aspects of the ad. In some embodiments, the ad production service 200 may be configured to change audio ad content automatically or programmatically, based on specified conditions such as ad performance or detection of particular conversion patterns. As shown, the ad production service 220 may implement audio ad production system 110 of FIG. 1, including the ad content optimization module 180 that is used to programmatically tune the content of audio ads based on observed feedback received from audio ad servers 240. Depending on the embodiment, the ad production service 220 may be implemented as a feature of the ad exchange 210, the ad servers 240, or in a separate computer system external to the infrastructure service provider network 200 (e.g. an advertiser audio at production system that integrates with the service provider network.

Generally speaking, the clients 270 may encompass any type of client configurable to submit network-based requests to service provider network 200 via network 260. For example, a given client device may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in service provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, a client 270 may be an application that interacts directly with service provider network 200. As shown, the clients 270 in this example includes content publisher systems 272, advertiser systems 274, and various consumer engagement systems 150 accessible to the ad delivery system. As discussed previously, the consumer engagement systems 150 may include a variety of computer systems such as user devices 276a, voice assistant devices 276b, audio play devices 276c, and web servers supporting particular websites 276d.

As shown, the clients 270 will convey network-based services requests to and receive responses from service provider network 200 via network 260. In various embodiments, network 260 may encompass any suitable combination of networking hardware and protocols necessary to establish network-based-based communications between clients 270 and service provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, a given client 270 and service provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and service provider network 200. It is noted that in some embodiments, clients 270 may communicate with service provider network 200 using a private network rather than the public Internet.

Figure 3:
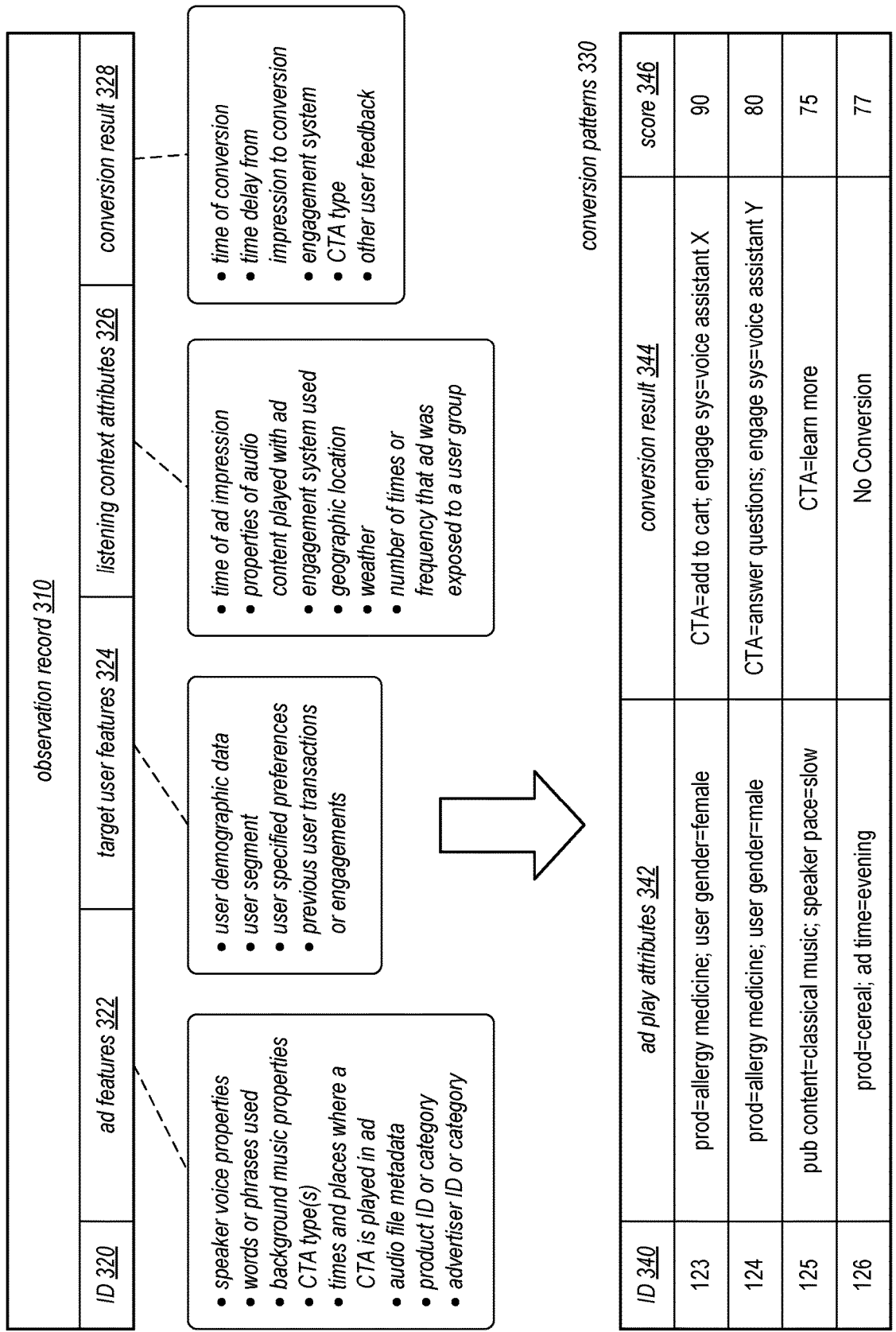
FIG. 3 illustrates example types of observation data used by the AAOS to detect conversion patterns of audio ads and examples of detected conversion patterns, according to some embodiments.

FIG. 3 illustrates example types of observation data used by the AAOS to detect conversion patterns of audio ads and examples of detected conversion patterns, according to some embodiments.

As shown, the top of FIG. 3 depicts an example observation record 310 from an observation dataset (e.g. observation data 151 of FIG. 1). In some embodiments, each observation record 310 may correspond to a single ad impression. Each observation record reflects attributes of the particular ad impression, which may include an observation record ID 320, ad features about the audio ad 322 (e.g. ad metadata 151c), target user features about the user/listener who received the ad impression 324, listening context attributes about the listening context of the ad impression 326 (e.g. listening context 151b), and attributes of the conversion result of the ad impression 328 (e.g. user conversion results 151a). In some embodiments, each observation record 310 may be encoded as a feature vector (e.g. a binary vector) to be consumed by ML models. The features included in the observation record 310 may vary depending on the type of ML model, and may be configurable via a configuration interface of the AAOS.

As shown, the ad features 322 may include attributes such as speaker voice properties (e.g. speaker pitch, inflection, pace, and mood), particular words or phrases used by the speaker, background music properties (e.g. music type, volume, and lyrical content), the type(s) of CTA used by the audio ad, the number of times and places in the ad where a CTA was played, metadata about the audio ad file (e.g. the presence of artist content in the ad), the ID or category of the product or service that was promoted by the audio ad, and the ID or category of the advertiser that supplied the audio ad.

As shown, the target user features 324 may include various attributes of the listener/user. These features may be received from the user engagement systems 150, in a similar manner as the listening context 151b, as discussed in connection with FIG. 1. The user features 324 may include attributes such as user demographic data (e.g. age group, gender), one or more user segments associated with the user (e.g. high income bracket, pet owner), and one or more user-specified preferences (e.g. interested in baseball, science fiction fan). In some embodiments, the user feature data may be associated with a particular user account that is tied to multiple user engagement systems (e.g. a smartphone and a voice assistant belonging to the user). In some embodiments, the user features 324 used by the system are anonymized to not include any personally identifiable information. For example, any user level data will be processed by privacy-enabling systems so that only aggregate data are received and used by the machine learning models of the system. In this manner, the insights generated by the system will not include or be dependent on any private user information.

As shown, the listening context attributes 326 may include things such as the time of the ad impression (e.g. time of day, day of week, month of year), various properties of the audio content played with the ad (e.g. category of podcast, funny content, classical music), the engagement system used to present the ad impression, the geographic location where the impression occurred, the weather at the geographic location when the impression occurred, and the frequency of the of the ad (e.g. the number of times that the audio ad or a related ad was exposed to a user segment associated with the listener within a recent period).

The conversion result 328 may simply indicate whether a conversion occurred as a result of the ad impression or not. As shown, the conversion result 328 may also include a number of attributes about a conversion, such as the time of conversion (which may be different from the time of ad impression), the time delay from the impression to conversion, the engagement system used to make the conversion (which may be different from the engagement system that provided the ad impression), the CTA type used to generate the conversion, and other types of user feedback related to the ad impression (e.g. how long the user listened to the audio ad, an indication that the user was or was not interested in the audio ad). In some embodiments, a conversion result 328 may indicate multiple user conversion actions that were caused by a single ad impression (e.g. purchase of product and comment on social media). In some embodiments, the conversion result 328 may indicate the absence of any measurable conversion, indicating that an ad exposure or impression had no effect on consumer conversion. These types of "no conversion" results may be used by the system to recognize conversion patterns about ineffective ad impressions.

As discussed, from the dataset of observation records 310, the AAOS will extract user conversion patterns, such as conversion patterns 330. In some embodiments, the conversion patterns 330 may be stored as structured records that can be used by other software components to perform optimizations. The conversion patterns 330 may indicate a unique pattern ID 340, a set or combination of ad play attributes 324, a type conversion result 344 that is correlated with the combination play attributes 342, and a pattern score 346. The ad play attributes 342 may be any combination of ad features 322, target user features 324, and listening context attributes 326 recorded in the observation records 310. The conversion result attributes 344 may be any combination of the conversion result attributes 328 recorded in the observation records 310.

It is noted that in some embodiments, a detected pattern may indicate one or more conversion result attributes 344 as independent variables and/or one or more ad play attributes 342 as dependent variables. For example, a pattern may indicate an "add to cart" CTA type of conversion strongly predicts a particular type of user engagement system. As another example, a conversion pattern may indicate that audio ads pertaining to trucks tend to be often presented with a male speaker voice. In some embodiments, the specific type(s) of the patterns detected by the AAOS is controllable by users through the configuration interface of the system.

Finally, the patterns score 346 of a pattern may indicate different metrics about the pattern. In some embodiments, the score 346 may be a performance measure of the type of conversion indicated by the pattern, which may be calculated based on the underlying observation data to reflect a conversion rate, an average time to conversion, or a combination of several conversion result attributes. In some embodiments, the score 346 may reflect a strength of the correlation between the ad play attributes 342 and the conversion result attributes 344. The strength of the correlation may be determined statistically based on the number of observation records supporting the pattern and the variance of conversion results, and may be used as an indicator of the confidence of the pattern.

Figure 4:
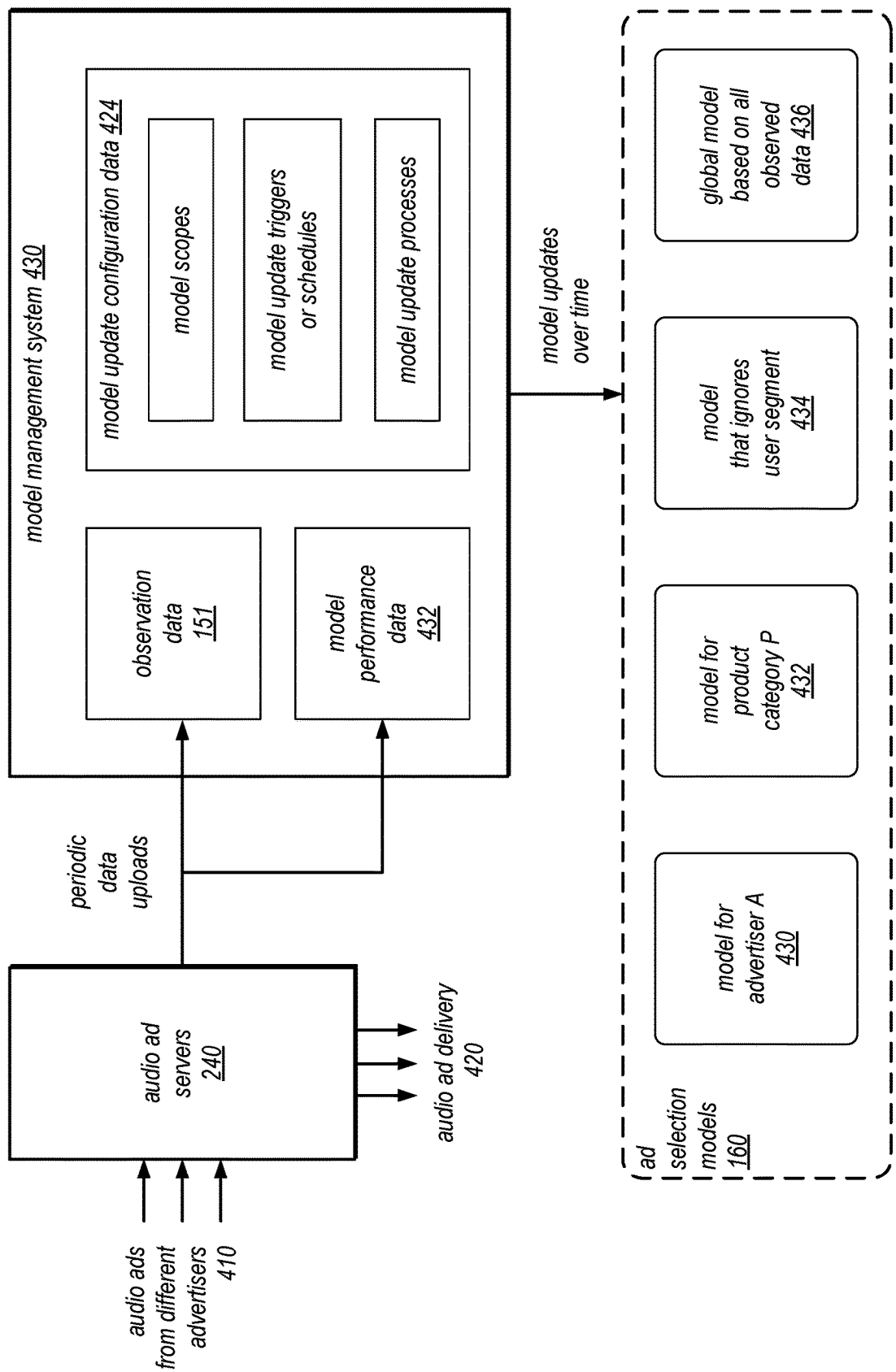
FIG. 4 illustrates an embodiment of a model management system that updates machine learning models used by the AAOS, according to some embodiments.

FIG. 4 illustrates an embodiment of a model management system that updates machine learning models used by the AAOS, according to some embodiments.

As shown, FIG. 4 depicts a model management system 430 that is configured to perform periodic model updates on ad selection models 160 of the AAOS. The model updates may be used to maintain model performance over time in response to the changing nature of user conversions, or improve the performance of the models.

As shown in this example, the audio ad servers 240 receive audio ads 410 from many different advertisers and delivers 420 the ads via its ad distribution network. The observation data 151 gathered by the audio ad servers 420 are periodically uploaded to the model management system 430. In some embodiments, the audio ad servers 240 may also monitor and upload model performance data 432 about its ad selection models. In other embodiments, the model performance data 432 may be generated by the model management system 430.

The model management system 430 operates according to model update configuration data 434 to update the ad selection models used by the audio ad servers 240. The configuration data 434 may be received via a configuration interface of the model management system, which may be accessible to administrators of the system or ordinary users (e.g. advertisers).

The model update configuration data 424 may control various aspects of how the model update management system operates. For example, as shown, the configuration data 424 may control the model scope of a particular ad selection model. The scope of the model reflects what portion of the observation data is used to build the model. For example, the bottom portion of the figure shows four ad selection models having different model scopes. Model 430 is a private model built from observation data associated with a particular advertiser A. The patterns extracted from model 430 may be visible only to advertiser A. Model 432 is built using observation data for all audio ads that promote products in product category P. Model 434 is built from observation data without taking into account a particular target user attribute (here the user segment). Model 436 is a global model that is built based on all observed data (e.g. all advertisers, product categories, and observation data attributes). The patterns extracted from model 436 may be publicly available to all advertiser users of the AAOS.

In some embodiments, the configuration data 424 may define triggers and/or schedules for an ongoing model update process. Model update triggers may be defined based on the model performance data 432. Model update schedules may define a regular schedule when model updates are performed (e.g. once a week).

In some embodiments, the configuration data 424 may specify different types of model update processes for updating the models. For example, one type of model update may enable additional training of the ad selection model using new observation data. As another example, the model management system may maintain multiple versions of an ad selection model, and promote the best performing model as the production version when the current production version's performance begins to degrade. In some embodiments, the AAOS may be configured to perform a re-extraction of user conversion patterns after the model update process has stabilized, to output any new conversion patterns learned as a result of the model update.

FIG. 5 illustrates an example user interface that outputs conversion patterns for a group of audio ads detected by the AAOS, according to some embodiments. The audio ad campaign report interface 510 shown in the figure may be implemented as part of the advertiser interface 212 of FIG. 2.

As shown, the GUI 500 provides a campaign report for a group of audio ads that are being played in a rotation by the audio ad delivery system. The audio ads in the group are part of a single ad campaign from a single advertiser. The top portion of the GUI displays certain summary information about the campaign.

As shown, section 520 displays the list of audio ads that are currently being played in the campaign. The ad version field 522 shows the name for each audio ad, which may be the name of the uploaded audio file. The ad features field 524 provides the ad features extracted for each ad, for example, the ad features 322 discussed in connection with FIG. 3. In this example, the GUI provides a clickable link to view the extracted ad features.

The top conversion patterns field 526 provides a list of ad features, user features, and/or listener context attributes that are observed to yield a significant conversion result (e.g. a statistically significant jump in conversation rates compared to the rest of the ad impressions). In some embodiments, the conversion patterns field 526 may reflect a conversion pattern learned by the AAOS that is specific to one particular audio ad (e.g. extracted from observation data for the particular ad). In this example, the conversion rate field 526 indicates the conversion rate for each displayed conversion pattern.

As shown, section 530 displays a list of conversion patterns that are not tied to any individual audio ads. The patterns shown in section 530 may be based on observation data learned by a global ad selection model, trained using ad impression data from a large number of different advertisers. In section 530, the conversion pattern attributes field 534 shows a combination of ad features, user features, and listening context attributes, that predicts the conversion result field 532 (e.g. highly correlated with the conversion results). The strength field 536 shows the correlation strength of each of the detected conversion patterns.

As shown, the bottom of the GUI provides a number of user controls (e.g. buttons) that allow the user to perform additional actions. The view details button may be used to view additional details about conversion patterns learned by the system (e.g. detailed statistical results of individual patterns). The download patterns button allows the user download the learned patterns as structured records (e.g. JSON records). The configure model button allows the user to make changes to parameters of the ML model(s) used to generate the conversion patterns (e.g., the model scope of the models). Finally, the modify ads button allows the user to change the set of ads used in the campaign, to add or remove ads or modify the contents of a current ad.

FIG. 6 illustrates an example user interface that outputs conversion patterns relevant to a new audio ad uploaded to the AAOS, according to some embodiments. The new audio ad upload interface 610 shown in the figure may be implemented as part of the advertiser interface 212 of FIG. 2.

GUI 600 depicts a user interface generated by an embodiment of the AAOS after an audio ad file has been uploaded. The AAOS may attempt to extract audio ad metadata from the audio ad immediately after the audio file is uploaded. The top of the GUI shows some of the extracted ad metadata. The GUI also provides user control elements to add the audio ad to an ad campaign, and to correct any ad metadata that were incorrectly inferred by the AAOS (e.g. by the audio processing models 134). In some embodiments, the user corrections may be stored by the AAOS and used to retrain or otherwise improve the performance of the audio processing models.

As shown, section 620 of the GUI shows a number of conversion patterns that are relevant to the audio ad that was just uploaded. In this example, the displayed patterns all pertain to the same product category (allergy medication) as the new audio ad. The conversion patterns shown here may be similar to the conversion patterns 530 discussed in connection with FIG. 5.

As shown, the bottom of the GUI provides a number of user control elements to perform additional user actions. The filter patterns button allows the user to further filter the conversion patterns shown in section 620, based on one or more user specified filter criteria (e.g. limit patterns shown to only female target users). The search patterns button allows the user to search for new patterns learned by the AAOS, based on one or more search criteria (e.g. show patterns with a pattern strength greater than a threshold). In some embodiments, the conversion patterns may be stored in a database system that maintains indexes for the patterns, which may be used to programmatically filter and search the patterns.

Finally, in this example, the recommend publisher media button allows the AAOS to recommend one or more types of available publisher media (e.g. types of publisher content available on an ad exchange) for the audio ad. The recommendation can be based on the ad metadata and/or the relevant conversion patterns associated with the audio ad. For example, if a relevant conversion pattern suggests that the uploaded audio ad may yield good conversion results when it is played during a particular type of publisher content, publisher ad media associated with that type of publisher content will be recommended.

Figure 7:
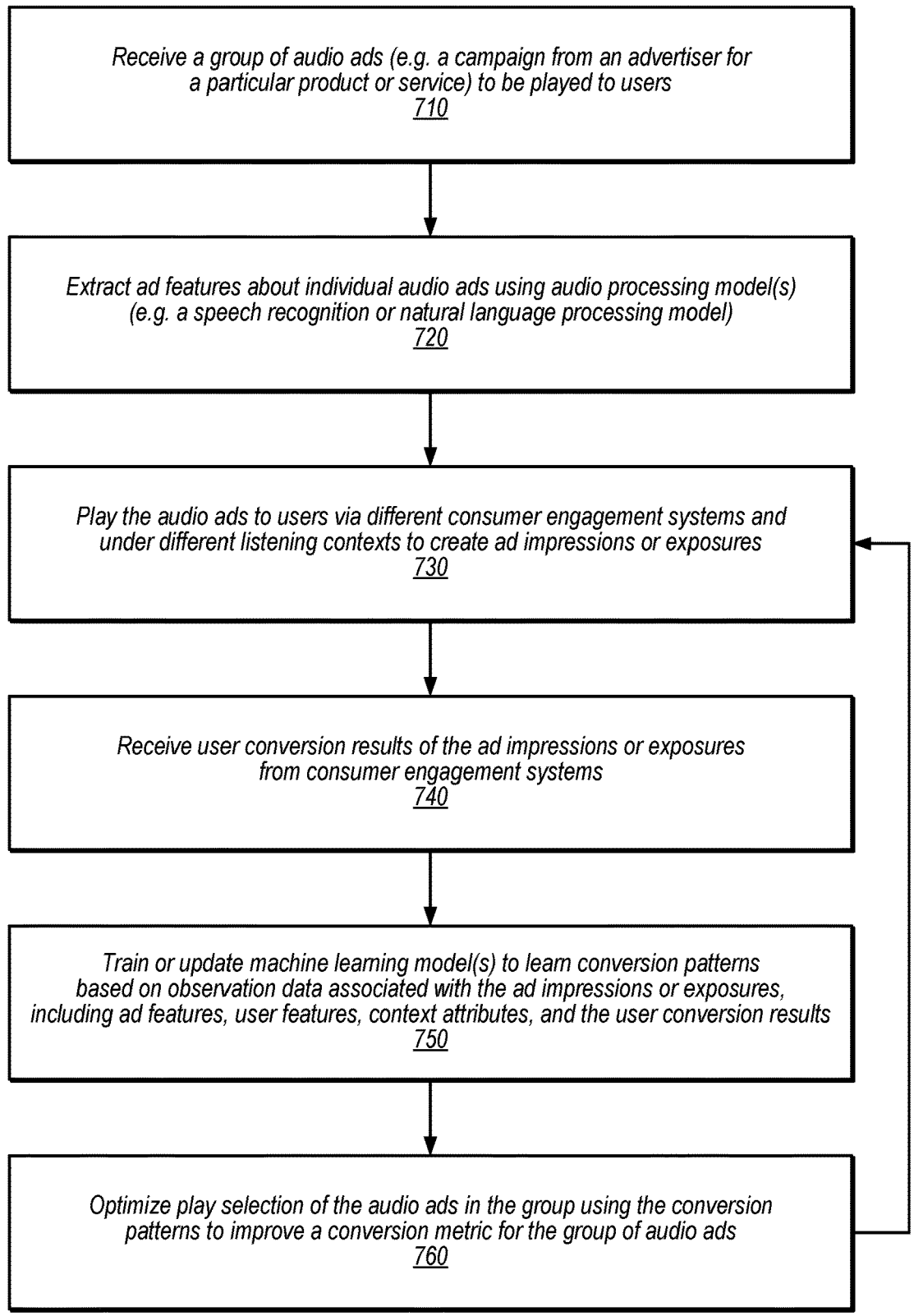
FIG. 7 is a flowchart illustrating a process performed by the AAOS to optimize a play selection of a group of audio ads, according to some embodiments.

FIG. 7 is a flowchart illustrating a process performed by the AAOS to optimize a play selection of a group of audio ads, according to some embodiments. The process may be performed by an embodiment of the AAOS 120 of FIG. 1.

The process begins at operation 710, where a group of audio ads is received by the AAOS, to be played to target users. In some embodiments, the group of ads may be ad variations in a single ad campaign. The ad variations may be uploaded by a single advertiser and used to promote a single product or service. In other embodiments, the group of ads may be provided by different advertisers or promote different products or services. The audio ads may be received as audio files via an ad receiving interface (e.g. ad receiving interface 122), which may be a programmatic interface or a user interactive interface.

At operation 720, ad features or metadata of the audio ads are extracted using audio processing model(s) (e.g. audio processing models 134). The audio processing models may include speech recognition and/or natural language processing models, and the extracted ad features may include various types of features discussed previously (e.g. audio ad metadata 136 and ad features 322). In some embodiments, the ad metadata may be stored as individual feature vectors along with the audio ad files.

At operation 730, the audio ads are played to users via different consumer engagement systems (e.g. consumer engagement systems 150) of the ad distribution network, and under different listening contexts (e.g. listening context 151*b* classified based on listening context attributes 326). Each play of an audio ad to a consumer creates an ad impression or exposure. The play selection of the audio ads may be determined by an ad play selection component (e.g. ad play selector 140) of the AAOS. In some embodiments, play selection for the group of audio ads may initially be random selection, without using any conversion patterns learned about the ads.

At operation 740, user conversion results (e.g. user conversion results 151*b*) of the ad impressions or exposures are received by the AASO from the consumer engagement systems. The conversion results may be received programmatically via the ad delivery interface (e.g. ad delivery interface 144) of the AAOS, and will indicate whether a user conversion occurred as a result of an ad impression. Depending on the embodiment, the user conversion result may also indicate other types of user conversion data about the ad impression (e.g. conversion result attributes 328). In some embodiments, the user conversion result may be returned by a different user engagement system from the user engagement system that delivered the audio ad.

At operation 750, the AAOS trains or updates machine learning models (e.g. ad selection models 160) to learn conversion patterns (e.g. user conversion patterns 162 and 330) from observation data associated with the ad impressions or exposures (e.g. observation data 151 formatted as observation records 310). As discussed in connection with FIG. 3, the observation data may include attributes indicating ad features about the ad, target user features about the user, listening context attributes about the listening context, and conversion result attributes. In some embodiments, the ML model may be built using a statistical technique (e.g. PCA) that recognizes statistically significant combinations of attributes for a type of conversion result. In some embodiments, the ML model may be a type of prediction model (e.g. a neural network) that is trained to predict the conversion result based on input attributes, and the conversion patterns learned by the model may be extracted using one or more model interpretation techniques. In some embodiments, each conversion pattern may be analyzed to determine a pattern score (e.g. pattern score 346, conversion metric 526, or strength metric 536). The conversion patterns learned by the ML models may be reduced to structure records such as JSON records. In some embodiments, the ML models may be managed, evaluated, updated, and interpreted by a machine learning service provided by a cloud-based infrastructure service provider network.

At operation 760, the play selection for the group of audio ads is optimized using the conversion patterns. The optimization may be performed by the audio ad servers, which may rely on the output of the ad selection model or the conversion patterns extracted or produced by the ad selection model. By using the conversion patterns, the audio ad servers will be able to better match audio ads (e.g. ads using different CTAs) to appropriate target users and/or listening contexts, in order to improve a conversion metric for the group of audio ads. As shown, in some embodiments, the process may occur repeatedly as a feedback loop, where the ad selection models, user conversion patterns, and/or ad play selection are continuously improved based on new observation data obtained for new ad impressions.

Figure 8:
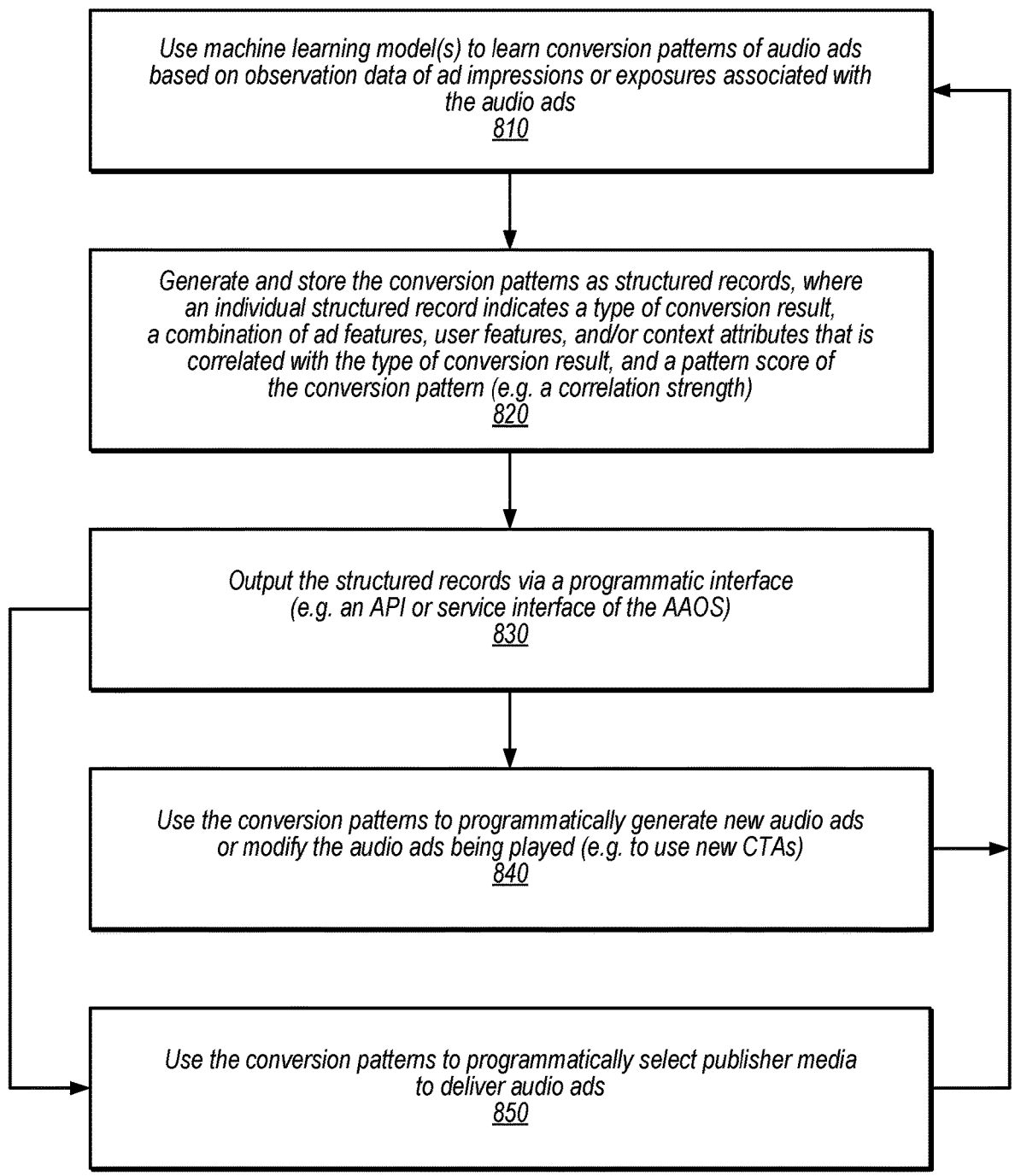
FIG. 8 is a flowchart illustrating a process to programmatically optimize audio ad content, according to some embodiments.

FIG. 8 is a flowchart illustrating a process to programmatically optimize audio ad content, according to some embodiments. The process may be performed by an embodiment of the AAOS 120 of FIG. 1.

At operation 810, the AAOS uses machine learning model(s) to learn conversion patterns of audio ads based on observation data associated with ad impressions or exposures of the audio ads. Operation 810 may be performed in a fashion similar to the process discussed in connection with FIG. 7.

At operation 820, the learned conversion patterns are generated and stored as structured data records, for example, using a component such as the pattern output component 170 of FIG. 1. In some embodiments, each structured record may indicate a type of conversion result, a combination of ad features, user features, and/or listening context attributes that is correlated with the type of conversion result, and a pattern score of the conversion pattern (e.g. a conversion metric or correlation strength). Example structured records of conversion patterns, with example data fields, are shown in FIG. 3. The structure records may be generated in a form that can be programmatically consumed by other software components. For example, the structure records may be generated as JSON objects. In some embodiments, the structured records may be stored in a database system, which allows the records to be filtered, searched, or queried using queries languages.

At operation 830, the structured records are output via a programmatic interface such as an API or service interface of the AAOS. The programmatic interface may be implemented as part of the advertiser interface 214 of FIG. 2. The outputting of the conversion patterns may be performed as part of an automated process between an audio ad production system (e.g. audio ad production system 110), and may occur periodically or be triggered as new conversion patterns are detected.

At operation 840, the conversion patterns are used (e.g. by an audio content optimization system 180) to programmatically generate new audio ads or modify existing audio ads (e.g. audio ads being played by the AAOS). The audio ad content optimization system may be implemented as a separate system from the AAOS (e.g. a remote advertiser system), or as part of the AAOS. The audio ad content optimization system 180 may be configured to automatically generate or update audio ads to, among other things, change the speaker voice or ad background music, use different types of CTAs, change the voice or music characteristics of CTAs, etc. This content optimization may be implemented as a feedback loop to continuously tune the content of audio ads to improve conversion results.

At operation 850, the conversion patterns are used to programmatically select publisher media to deliver audio ads. In some embodiments, this type of optimization may be performed as part of audio ad play selection, where audio ads are selected for ad impressions based on the type of publisher content. In some embodiments, this optimization may be performed when a new audio ad is uploaded, as seen in FIG. 6, where conversion patterns relevant to the new audio ad are used to recommend publisher media for purchase. Publisher media optimization may also be implemented as a feedback loop to continuously improve the quality of publisher media selection in various systems.

Figure 9:
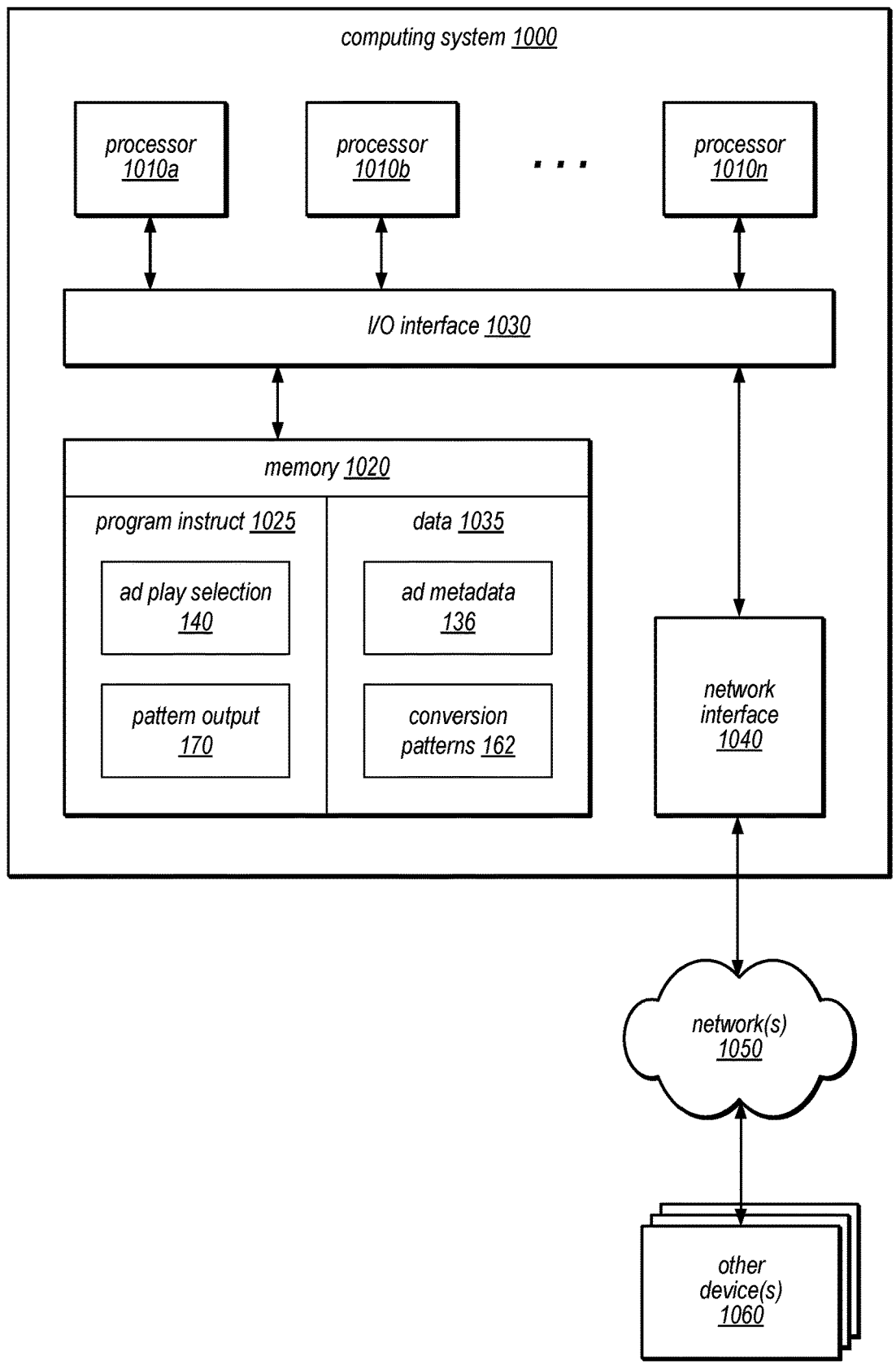
FIG. 9 is a block diagram illustrating an example computer system that can be used to implement one or more portions of the AAOS, according to some embodiments.

FIG. 9 is a block diagram illustrating an example computer system that can be used to implement one or more portions of the AAOS, according to some embodiments.

Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035. As shown, in some embodiments, the program instructions memory 1025 may be used to implement one or more executable components such as the ad play selection 140 and pattern output 170 components of FIG. 1. As shown, in some embodiments, the data memory 1035 may be used to store data such as the ad metadata 136 and conversion patterns 162 of FIG. 1.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more processors with associated memory that implement an audio ad delivery system, configured to:
receive, via a programmatic interface, a group of audio ad files from an advertiser for a particular product or service;
process the audio ad files using one or more trained audio processing models to extract ad features about individual ones of the audio ads, including respective types of calls-to-action (CTAs) used by the audio ads identified in audio content of the audio ad files using a speech recognition model;
send, via one or more audio ad servers, the audio ad files to different consumer engagement systems and under different listening contexts to play the audio ad files to create ad impressions;
receive user conversion results of the ad impressions from the consumer engagement systems;
train a machine learning model to learn conversion patterns for respective types of CTAs used by the audio ads in the different listening contexts;
update the machine learning model based on observation data associated with the ad impressions collected by one or more audio ad servers, the observation data including the ad features, user features of the users, context attributes of the listening contexts, and the user conversion results; and
automatically optimize delivery of subsequent audio ads, comprising deliver, via the one or more audio ad servers, additional plays of the audio ad files, wherein the one or more audio ad servers use the conversion patterns for respective types of CTAs in the different listening contexts to select particular versions of the audio ads for the additional plays in particular listening contexts of the listening contexts.

2. The system of claim 1, wherein the group of audio ads use different types of CTAs that call for different types of user actions with respect to a product or service, including two or more of:
visiting a website associated with the product or service;
subscribing to a mailing list associated with the product or service;
requesting information about the product or service;
asking a voice assistant about the product or service;
requesting a free trial of the product or service;
adding the product or service to a wish list or shopping cart;
ordering the product or service; or
sharing or commenting on the product or service via a social media network.

3. The system of claim 1, wherein the audio ad delivery system is configured to:
store the conversion patterns as structured records, wherein a structured record of a conversion pattern indicates a type of conversion result, a combination of ad features, user features, or context attributes that is correlated with the type of conversion result, and a pattern score associated with the conversion pattern; and
output the structured records via a programmatic interface of the audio ad delivery system, wherein the structured records are used by an audio ad production system to programmatically generate new audio ads or modify one or more audio ads in the group.

4. The system of claim 1, wherein the ad features of an audio ad include one or more of:
a speaker voice or a music property of a CTA in the audio ad;
a number of times that the CTA is played in the audio ad; or
an indication of when the CTA is played during the audio ad.

5. The system of claim 1, wherein the context attributes associated with an ad impression associated with an audio ad include one or more of:
properties of publisher content during which the ad impression was created;
a type of consumer engagement system used to create the ad impression;
a time of the ad impression; or
a frequency or number of times that the audio ad or a variation of the audio ad were exposed to one or more users prior to the ad impression.

6. The system of claim 1, wherein a user conversion result of an ad impression associated with an audio ad includes one or more of:
a type of consumer engagement system that received a user conversion as a result of the ad impression;
a time when the user conversion occurred;
a length of time between the ad impression and the user conversion; or
a type of CTA that generated the user conversion.

7. A method, comprising:
performing, by one or more processors with associated memory that implement audio ad delivery system:
processing audio ad files using one or more trained audio processing models to extract ad features about individual audio ads in a group of audio ads, including respective types of calls-to-action (CTAs) used by the audio ads identified in audio content of the audio ads using a speech recognition model;
sending, via one or more audio ad servers, the audio ad files via different consumer engagement systems and under different listening contexts to play the audio ad files to create ad impressions;
receiving user conversion results of the ad impressions from the consumer engagement systems;
training a machine learning model to learn conversion patterns for respective types of CTAs used by the audio ads in the different listening contexts;
updating the machine learning model based on observation data associated with the ad impressions collected by one or more audio ad servers, the observation data including the ad features, user features of the users, context attributes of the listening contexts, and the user conversion results; and
automatically optimizing delivery of subsequent audio ads, comprising delivering, via the one or more audio ad servers, additional plays of the audio ad files, the one or more audio ad servers using the conversion patterns for respective types of CTAs in the different listening contexts to select particular versions of the audio ads for the additional plays in particular listening contexts of the listening contexts.

8. The method of claim 7, wherein the group of audio ads use different types of CTAs that call for different types of user actions with respect to a product or service.

9. The method of claim 7, further comprising the audio ad delivery system:
storing the conversion patterns as structured records, wherein a structured record of a conversion pattern indicates a type of conversion result and a combination of ad features, user features, or context attributes that is correlated with the type of conversion result; and
programmatically generating a new audio ad or modify one or more audio ads in the group based on the structured records.

10. The method of claim 7, further comprising outputting the conversion patterns via a graphical user interface (GUI).

11. The method of claim 10, wherein:
the conversion patterns reflect user conversion results for audio ads of a plurality of advertisers; and
the conversion patterns are provided to advertisers other than an advertiser that provided the group of audio ads.

12. The method of claim 10, further comprising:
receiving, via the GUI, a filter or search request for conversion patterns learned by the audio ad delivery system; and
returning, via the GUI, one or more conversion patterns in response to the filter or search request.

13. The method of claim 7, wherein the machine learning model is trained based on observation data associated with audio ads of a plurality of advertisers.

14. The method of claim 7, wherein the machine learning model is periodically updated based on new observation data including new user conversion results.

15. The method of claim 7, wherein the machine learning model is hosted by a machine learning service of an infrastructure service provider network.

16. The method of claim 7, further comprising the audio ad delivery system:
initially selecting audio ads to play from the group in without using the conversion patterns; and
after the conversion patterns are detected based on observation data generated from the initial selection, using the conversion patterns to make further selections from the group.

17. The method of claim 7, wherein:
a user conversion result received by the audio ad delivery system indicates a type of CTA implemented by a voice assistant device associated with a user, wherein the voice assistant device is configured to perform:
playing a first type of CTA that prompts the user to add an item to a shopping cart or an item list;
playing a second type of CTA that answers one or more questions about an item or service from the user; or
playing a third type of CTA that poses one or more questions to the user about an item or service, wherein user responses to the one or more questions are included in the user conversion result.

18. One or more non-transitory computer-accessible storage media storing program instructions that when executed on one or more processors of an audio ad delivery system, cause the audio ad delivery system to:
- process audio ad files using one or more trained audio processing models to extract ad features about individual audio ads in a group of audio ads, including respective types of calls-to-action (CTAs) used by the audio ads identified in audio content of the audio ad files using a speech recognition model;
- send, via one or more audio ad servers, the audio ad files to different consumer engagement systems and under different listening contexts to play the audio ad files to create ad impressions;
- receive user conversion results of the ad impressions from the consumer engagement systems;
- train a machine learning model to learn conversion patterns for respective types of CTAs used by the audio ads in the different listening contexts;
- update the machine learning model based on observation data associated with the ad impressions collected by one or more audio ad servers, the observation data including the ad features, user features of the users, context attributes of the listening contexts, and the user conversion results; and
- automatically optimize delivery of subsequent audio ads, comprising deliver, via the one or more audio ad servers, additional plays of the audio ad files, wherein the one or more audio ad servers use the conversion patterns for respective types of CTAs in the different listening contexts to select particular versions of the audio ads for the additional plays in particular listening contexts of the listening contexts.

19. The non-transitory computer-accessible storage media of claim 18, wherein the group of audio ads use different types of CTAs that call for different types of user actions with respect to a product or service.

20. The non-transitory computer-accessible storage media of claim 18, wherein the program instructions when executed on the one or more processors cause the audio ad delivery system to output the conversion patterns via a graphical user interface.

* * * * *